F. L. LANDER.
FLOAT GAGE.
APPLICATION FILED JUNE 14, 1910.
981,434.
Patented Jan. 10, 1911.
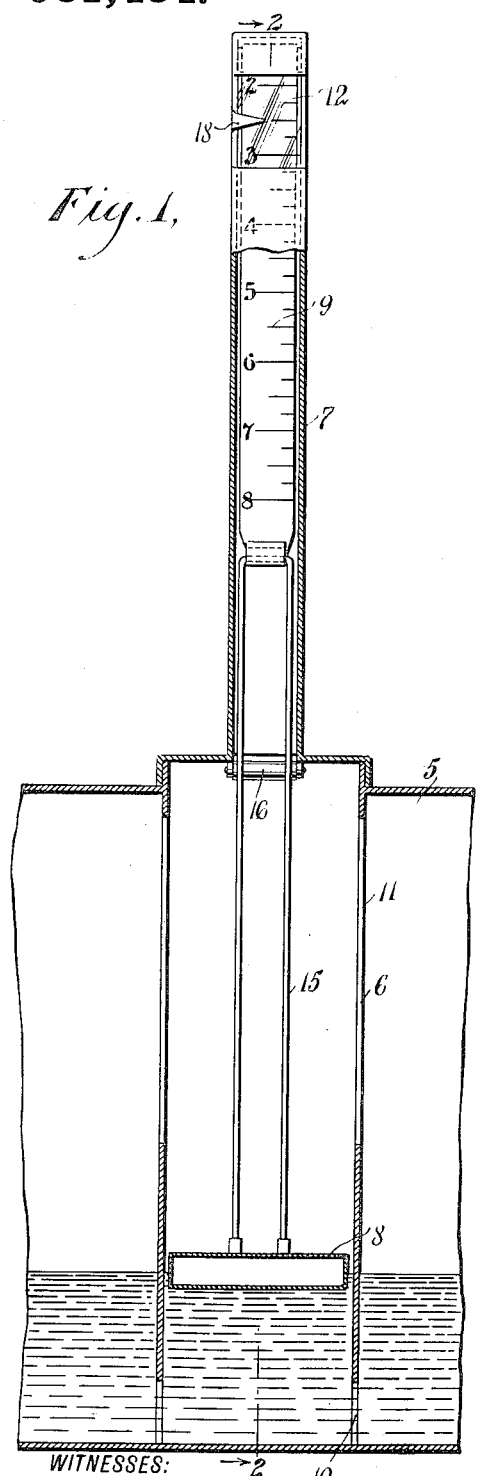
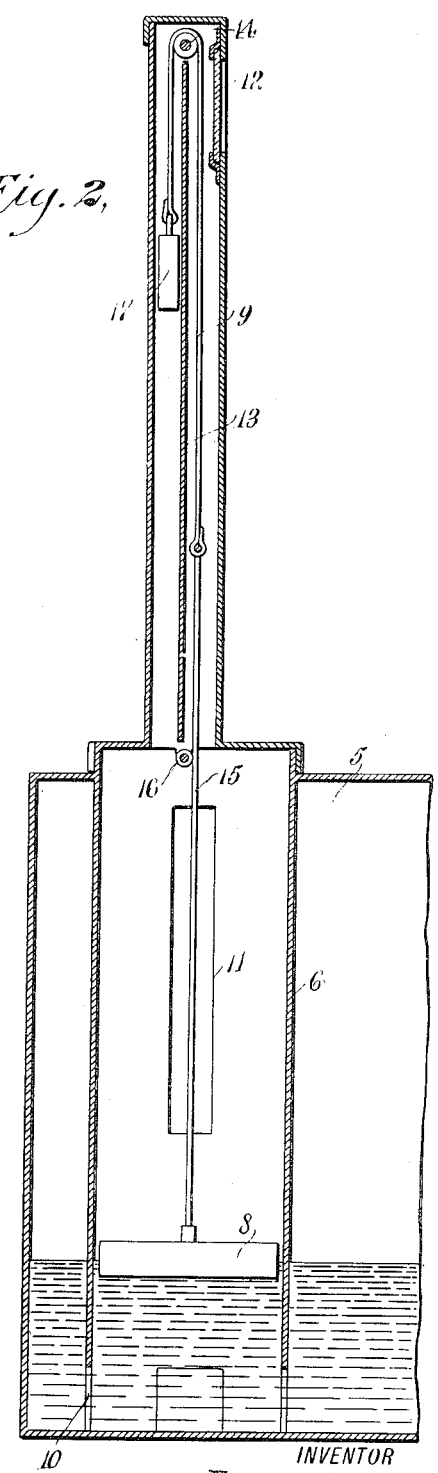
WITNESSES:
Edward Thorpe
INVENTOR
Freeman L. Lander
BY
ATTORNEYS

UNITED STATES PATENT OFFICE.

FREEMAN L. LANDER, OF BANGOR, MAINE.

FLOAT-GAGE.

981,434.            Specification of Letters Patent.   Patented Jan. 10, 1911.

Application filed June 14, 1910. Serial No. 566,782.

*To all whom it may concern:*

Be it known that I, FREEMAN L. LANDER, a citizen of the United States, and a resident of Bangor, in the county of Penobscot and State of Maine, have invented a new and Improved Float-Gage, of which the following is a full, clear, and exact description.

The invention is an improvement in gages for determining the amount of liquid remaining within a tank, and is particularly designed for the gasolene tanks of automobiles.

The invention has in view a gage of this character which will indicate the amount of gasolene or other liquid available, with approximate accuracy, and which will not be deranged or disordered by the swaying and bouncing of the automobile, as when the latter is in motion.

Reference is to be had to the accompanying drawings forming a part of this specification, in which similar characters of reference indicate corresponding parts in both the views.

Figure 1 is a vertical section of my improved float gage as applied to a gasolene tank; and Fig. 2 is a section on the line 2—2 of Fig. 1.

My improved gage is suitable for any liquid-carrying tank, particularly an automobile gasolene tank 5, and comprises a float well 6, a gage arm 7, a float 8 and a gage 9. The well 6 is suitably placed in communication with the tank, preferably by arranging the well within the tank, as shown, the well extending to the bottom of the tank, where it is provided with a number of liquid inlet openings 10, and at points thereabove near the top of the tank with openings 11, which permit of the escape of the air from the well when the tank is being filled, and thus prevent the well from being air bound.

The arm 7 extends upwardly from the top of the well, and at one side near its upper end is provided with an opening 12 covered with glass or other transparent material through which the gage 9 is readable. Between the side of the tubular gage arm containing the opening 12, and the opposite side of this arm, extends for substantially the full length of the arm, a partition 13, the partition at the top terminating short of the top of the gage arm, where the latter is provided with a sheave 14, over which the gage 9 travels, the gage being in the nature of a tape or like flexible gage member, suitably graduated for the tank to which the gage is to be applied. The gage is connected to the float 8 through the intermediary of a loop 15, ordinarily of wire, with the side wires or bars of which the loop is comprised, bearing against the roller 16 arranged immediately below the partition 13. The free end of the gage has a weight 17 applied thereto, which is sufficiently heavy to keep the tape under slight tension and take up the slack of the tape when the float rises.

The float 8 fits within the float well to move therein with the rise and fall of the liquid level, with comparative freedom, yet is incapable of striking the sides of the well with any considerable force when the automobile is in motion, the weight of the float, together with the loop 15, being sufficient to overcome the weight of the gage tape 9 and weight 17, so that when the float is in its uppermost position it will readily fall with the liquid level as the latter drops in the tank. The float well is ordinarily extended a slight distance above the top of the tank, as shown in the drawing figures, so that when the tank is full, the float will not be submerged. The sheave and roller 14 and 16 adapt the gage to move with the least possible friction so that the gage will indicate the amount of liquid remaining in the tank, with approximate accuracy, the reading being taken from an index finger 18 projecting in front of the tape at the opening 12. Ordinarily, the tape will be graduated in gallons, with the zero arranged to register with the index finger 18 when the gasolene or other liquid in the tank has been exhausted.

Having thus described my invention, I claim as new and desire to secure by Letters Patent:

1. The combination of a tank, a float well communicating with the tank, a tubular gage arm extending upwardly from the well, having an opening, the arm having a vertical partition, rollers arranged above and below the partition, a float within the well, having a member extending upwardly therefrom and bearing on the roller below the partition, a flexible tape graduated to indicate the amount of liquid within the tank, connected to said member and passing upwardly over the upper roller and readable through the said opening, and a weight applied to the tape within the gage arm at the opposite side of the partition.

2. The combination of a tank, a float well communicating with the tank and forming a permanent part thereof, a gage arm relatively small in cross-sectional area than the well and extending upwardly from the well and above the tank and having an opening, a float in the well, and a gage arranged in the arm above the well and readable through said opening, and means connecting the float and gage.

3. The combination of a tank, a float well communicating with the tank, a gage arm extending upwardly from the well, the arm having a partition dividing it into two passages, a sheave arranged over the partition, a flexible gage passing over the sheave, a float in the well, means connecting the float to one end of the gage in one of said passages, and a weight in the other of said passages connected to the other end of the gage.

4. In a gage for tanks, a float well adapted to communicate with the tank, a gage arm extending upwardly from the well, a sheave arranged near the top of the arm, a bearing roller arranged near the bottom of the arm, a flexible gage passing over the sheave, a float movable in the well, a relatively stiff member attached to the float and to one end of the gage and bearing on the said roller, and a weight connected to the opposite end of the gage.

In testimony whereof I have signed my name to this specification in the presence of two subscribing witnesses.

FREEMAN L. LANDER.

Witnesses:
 GUY P. BAILEY,
 FRED B. GOODINE.